United States Patent
Kampen

(10) Patent No.: US 9,121,445 B2
(45) Date of Patent: Sep. 1, 2015

(54) BEARING DEVICE FOR SCREW CONVEYOR SHAFTS

(75) Inventor: Berthold Kampen, Recke (DE)

(73) Assignee: WHEELABRATOR GROUP GmbH, Metelen (DE)

( * ) Notice: Subject to any disclaimer, the term of this patent is extended or adjusted under 35 U.S.C. 154(b) by 0 days.

(21) Appl. No.: 14/127,230

(22) PCT Filed: Jun. 6, 2012

(86) PCT No.: PCT/DE2012/100173
§ 371 (c)(1),
(2), (4) Date: Dec. 18, 2013

(87) PCT Pub. No.: WO2012/175074
PCT Pub. Date: Dec. 27, 2012

(65) Prior Publication Data
US 2014/0140649 A1    May 22, 2014

(30) Foreign Application Priority Data

Jun. 20, 2011  (DE) .......................... 10 2011 051191

(51) Int. Cl.
*F16C 19/08*    (2006.01)
*F16C 27/06*    (2006.01)
*F16C 33/76*    (2006.01)

(52) U.S. Cl.
CPC ............... *F16C 27/066* (2013.01); *F16C 19/08* (2013.01); *F16C 33/76* (2013.01)

(58) Field of Classification Search
CPC .......... F16C 19/08; F16C 19/18; F16C 27/66; F16C 33/78; F16C 33/7896
USPC .......... 384/477, 484, 486, 535, 536; 198/672, 198/673
See application file for complete search history.

(56) References Cited

U.S. PATENT DOCUMENTS

| | | | | |
|---|---|---|---|---|
| 5,110,143 | A * | 5/1992 | Hibbetts | 277/346 |
| 6,007,252 | A * | 12/1999 | Thelen et al. | 384/535 |
| 6,536,953 | B1 | 3/2003 | Cope et al. | |
| 2002/0131660 | A1* | 9/2002 | Bade et al. | 384/536 |
| 2008/0267549 | A1* | 10/2008 | Yamada | 384/536 |

FOREIGN PATENT DOCUMENTS

| | | |
|---|---|---|
| DE | 3701887 A1 | 8/1988 |
| DE | 4209320 A1 | 3/2003 |
| DE | 102008037990 A1 | 2/2010 |
| EP | 127374 A1 | 1/2003 |
| WO | 2008125792 A1 | 10/2008 |

* cited by examiner

*Primary Examiner* — Phillip A Johnson
(74) *Attorney, Agent, or Firm* — Karl F. Milde, Jr.; Eckert Seamans Cherin & Mellott, LLC

(57) ABSTRACT

A bearing device (100) for screw conveyor shafts (200) comprises at least one shaft bearing unit (20) and a connecting shaft (50), guided in the shaft bearing unit (20), for connecting one or more screw conveyor shafts. The bearing device includes a stationary external housing (11) in which at least one shaft bearing unit (20) is arranged in a pivotable manner. At least one elastomeric ring element (13) is arranged between an inner surface of the external housing (11) and a lateral external surface of the shaft bearing unit (20).

15 Claims, 3 Drawing Sheets

BEARING DEVICE FOR SCREW CONVEYOR SHAFTS

BACKGROUND OF THE INVENTION

The invention relates to a bearing device for screw conveyor shafts comprising at least one shaft bearing with and one connection shaft guided in the shaft bearing unit for connecting to at least one screw conveyor shaft.

Such bearing/coupling units are used to rotatably support screw shafts in conveyor systems for transporting solids, in particular screw shafts for transporting particulate blasting agents in surface treatment systems. Furthermore, two screw shafts can be connected to each other at such a unit.

Since the screw shafts are stressed unevenly when transporting solid matter and also cover a great distance of 5 to 6 meters between the bearing points, the bearing shoulders of the screw shafts are not aligned with, the axes of the shaft bearings or with a connecting shaft, respectively, which is rotatably supported in the hanging bearing device and to the front of which the screw shafts are connected. During operation, this can result in tilted angles of the axes and to oscillating movements that need to be compensated for inside the shaft bearing unit. For this purpose, spherical roller bearings, in which the connecting shaft is mounted, are provided according to the prior art. In harsh environments with heavy dust development, however, dust quickly enters the spherical roller bearing, so that said bearing wears quickly and needs to be replaced, which in turn results in down times of the conveyor unit. An enclosure of the shaft bearing unit as a dust protection is not possible, since the gap width between a round central opening of a stationery housing and the connecting shaft would change constantly precisely because of said axis misalignments and oscillating movements.

SUMMARY OF THE INVENTION

The problem addressed by the present invention is thus to provide a bearing device for screw conveyor shafts that have a long service life even in harsh working environments.

This objective is achieved, according to the invention, by swivelly mounting a shaft bearing unit within a stationary external housing of the bearing device. To effectuate this mounting, at ne elastomeric ring element is arranged between the inner surface of the external housing and a lateral surface the shaft bearing unit.

The bearing device according to the invention shifts the correction of the axis misalignment into the elastomeric ring element. In this manner, the actual shaft bearing unit can be aligned precisely with the bearing shoulders of the screw conveyor shaft or of the associated connecting units and can fee sealed completely relative to the rotating connecting shaft by means of essentially known shaft seal rings.

Support, for the connecting shaft in the shaft bearing unit can be accomplished by two simple grooved ball bearings, since no axial forces and no bending moments are exerted on the bearings. Thus, the shaft bearing unit in its entirety follows a movement of the connecting shaft, which is caused by the laterally mounted screw conveyor shafts.

Compared to the stationary parts of the bearing device, the elastomeric intermediate layer provides a correction and furthermore establishes restoring forces, such that an aligned position with the structurally provided central axis is again established, when all unilateral forces and moments that are introduced via one of the connected screw conveyor shafts are canceled out.

The elastic ring, element is formed in particular of a polyurethane sealing compound, which is poured in a viscous state between the inner ring of the stationary outer housing and an outer jacket of the shaft bearing unit. This causes the outer housing and the inner housing to be bonded together, such that—to a limited extent—potential axially acting tensile forces can be absorbed.

Preferably, the cured sealing compound has a hardness of 50-80 Shore-A, especially of 60 Shore-A. The thickness of the elastomeric layer is preferably about 10 mm. With these properties, a misalignment of the axes of up to 3° can be well compensated.

Moreover, dust-tight sealing of the rotating shaft relative to the housing of the shaft bearing unit is possible, as is essentially known.

For a full understanding of the present invention, reference should now be made to the following detailed description of the preferred embodiments of the invention as illustrated in the companying drawings.

DESCRIPTION OF THE PREFERRED EMBODIMENTS

Figure 1:
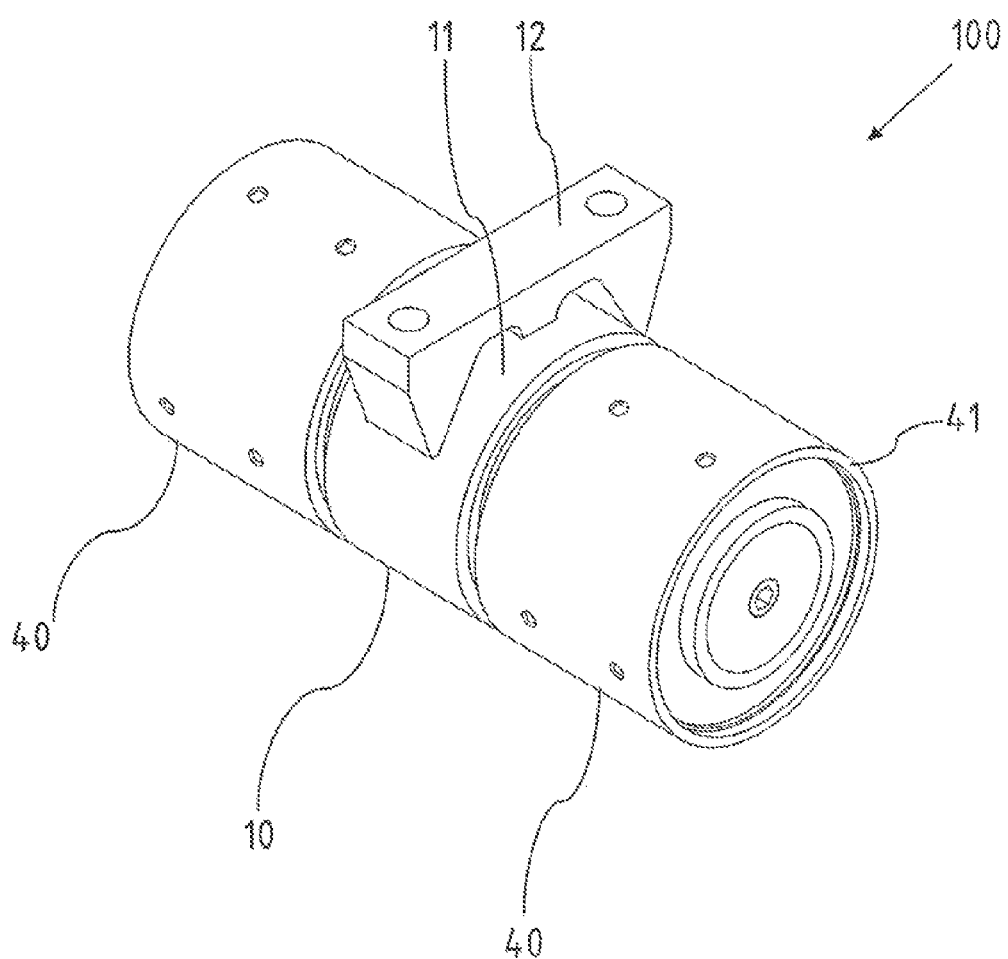
FIG. 1 is a perspective view of a bearing device according to the invention.

The preferred embodiments of the present invention will now be described with reference to FIGS. 1-3 of the drawings.

Identical elements in the various are designated with the same reference numerals.

FIG. 1 shows a bearing device 100 according to the invention comprising essentially three sections: A base unit 10 is arranged at the center followed on either side by a connecting unit 40.

The base unit 10 includes an outer housing 11 having a carrier element 12 attached to it and a shaft bearing unit located on the inside, which is not visible here.

The connecting units 40 are provided adjacent on the side and are permanently connected to the ends of a connecting shaft rotating inside the base unit 10 and allowing a direct connection of the screw conveyor shafts.

To provide little contact surface, in particular in the case of the preferred use in surface treatment devices where blasting agents are introduced into the working chamber with a large kinetic energy, the outer housing 11 of the base unit 10 as well as the outer housing shells 41 of the connecting units 40 are each of tubular design, wherein same diameters are provided to avoid protruding shoulders that could provide a contact surface for the blasting agent.

Figure 2:
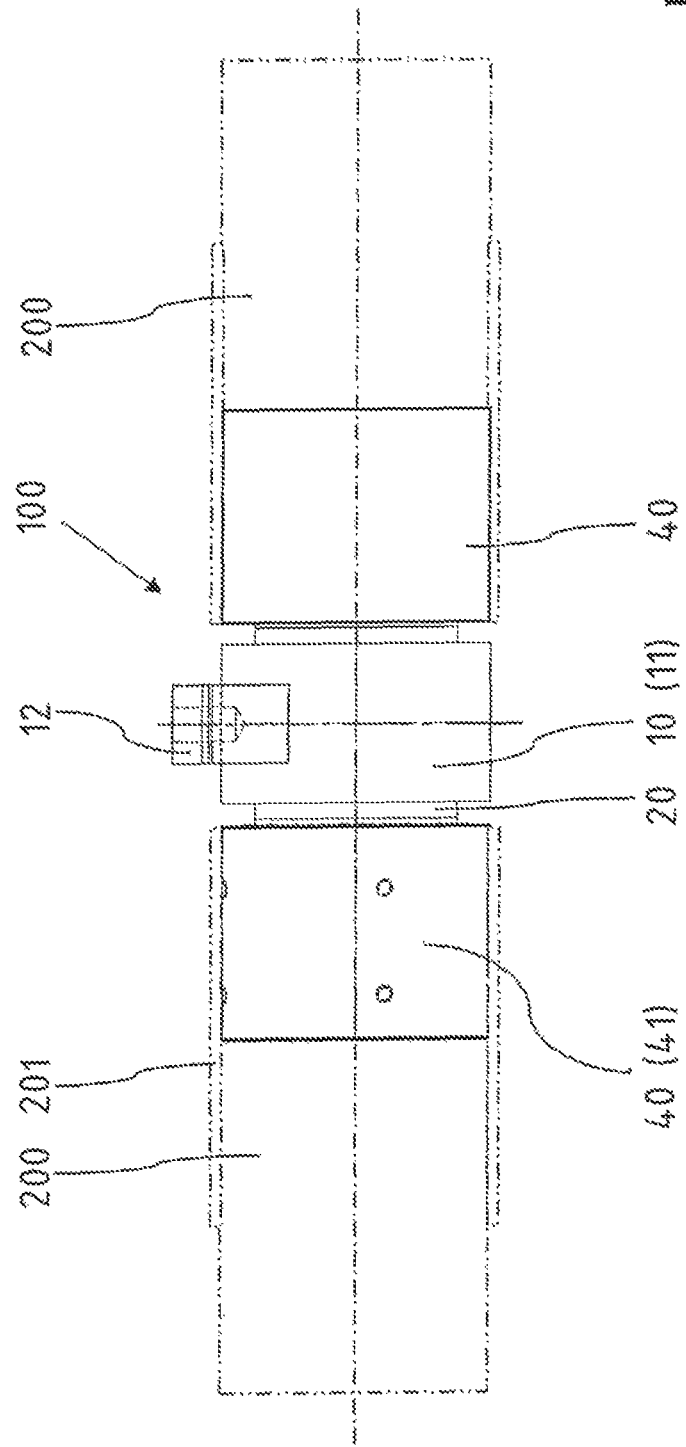
FIG. 2 is a side view of the bearing unit.

FIG. 2 shows the bearing device 100 from the side. A small gap through which the inner shaft bearing unit 20 can be recognized is present between the base unit 10 in the center and the two laterally adjacent connecting units 40. The gap width is preferably selected large enough with at least 5 to 10 mm such that dust or other particles that have entered can be discharged easily downward. With the upwardly facing carrier element 12, the bearing device 100 according to the invention is particularly provided for use as a hanging bearing device.

In the shown exemplary embodiment, the respective screw shafts 200 that are to be supported and which are indicated by dash-dot lines follow laterally. Connecting sleeves 201 are slid over the tubular housing shells 41 of the connecting units 40 and then secured rotationally fired with the aid of the threaded holes that have been introduced into the housing shell 41.

Figure 3:
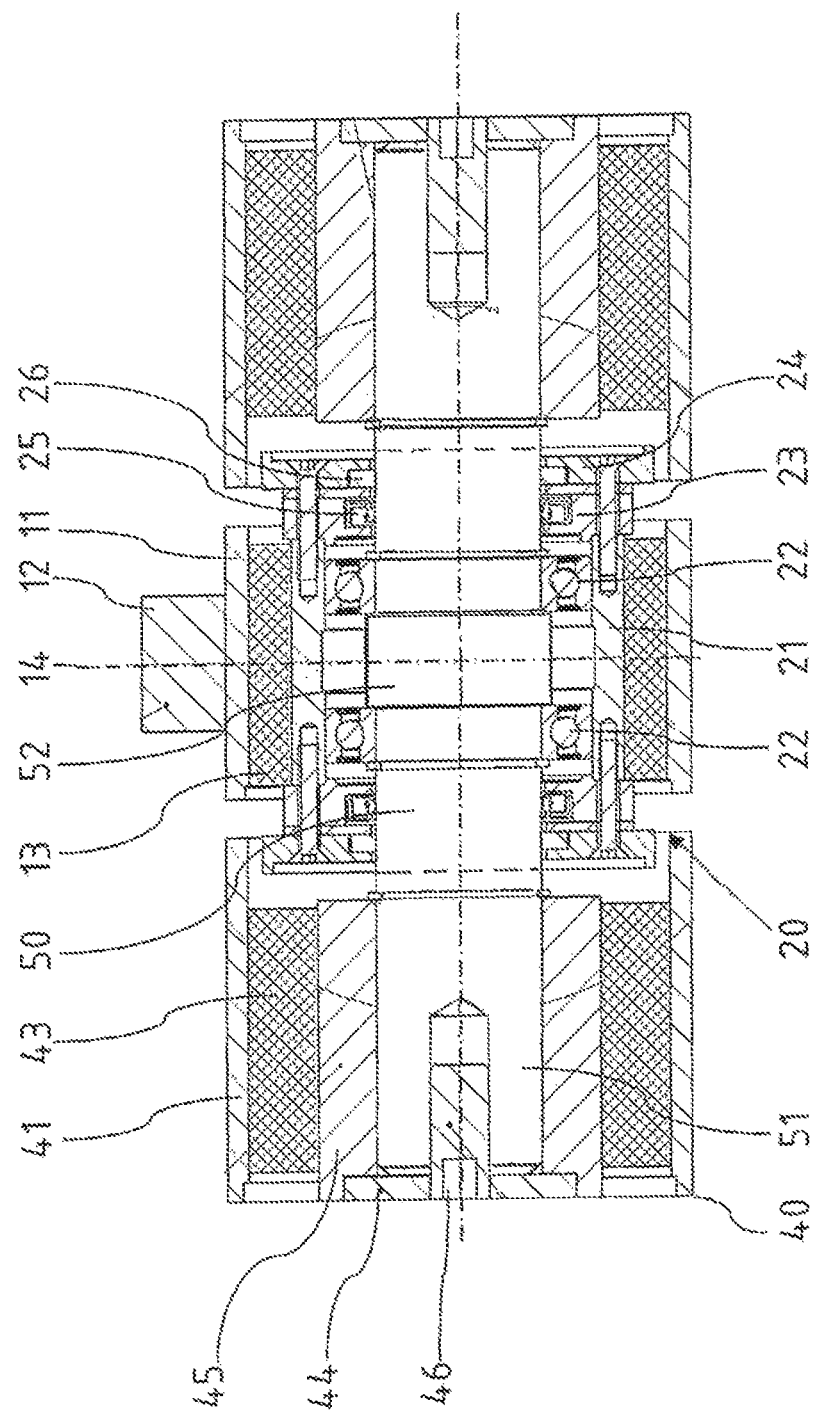
FIG. 3 a side sectional view of the bearing unit.

The structure of the bearing device 100 that is essential to the invention can be recognized in particular from the sectional presentation in FIG. 3.

A rotating connecting shaft 50 is arranged on the inside and has bearing shoulders 51 at both sides onto which the connecting units 40 can be placed, A shoulder 52 is formed in the center and is followed on both sides with grooved bail bearings 22, which are each axially sectored using a retaining ring. A shaft sealing ring 25 is arranged in an intermediate ring 23 toward the outside, i.e., outside in front of the grooved ball bearings 22.

An additional felt seal 26 that loops over the surface of the connecting shaft 50 and is supported in a cover ring disc 24 is provided further outside therefrom. The cover ring disc 24 and the interim ring 23 are fastened to a housing 21 of the shaft bearing unit 20 in a centered fashion.

The housing 21 of the shaft bearing unit 20 is connected permanently, in particular molded, to the outer housing 11 of the base unit 10 via an elastomeric ring element 13. Thus, the entire shaft bearing unit 20 can tilt to both sides from the point of intersection of the central axis and the vertical axis 14, which can be recognized in FIG. 3, and in this manner can compensate for oscillations of the laterally connected screw conveyors 200.

The inner shaft bearing unit 20 extends axially beyond the outer housing 11 of the base unit 10 to the outside, but has a smaller diameter. The tubular housing shells 41 of the external connecting units 40, on the other hand, have a larger diameter and extend axially in part beyond the protruding portions of the shaft bearing unit 20 in the direction of the center axis 14. This creates a type of labyrinth seal. Particles entering from the outside into the gap between the base units and connecting units 10, 40 are first redirected three times before they can enter into the annular gap between the connecting shaft 50 and the cover ring disc 24 located on the outside.

After that they are, however, caught directly by the fait seal 26. Fine particles that pass through the contact plane between the inside of the felt ring 26 and the outer side of the connecting shaft 50 are ultimately retained at the shaft sealing ring 25 with its flexible sealing lip.

In the shown exemplary embodiment, the connecting units 40 each include a connecting sleeve 45 that can be placed directly on the bearing shoulder 51 located at the end of the connecting shaft 50. Their axial position is restricted by a retaining ring. At the front, from the face side, a locking plate 44 is provided and secured in a threaded bore in the connecting shaft 50 using a screw 46.

The connecting sleeve 45 is in contact with at least one additional elastomeric region 43. Respective radial fins, which are not visible in FIG. 3, and between which elastomeric areas 43 are provided that prevent direct contact of the fins but allow for a torque transfer between the connecting sleeve 45 and the housing shell 41 axe welded to the tubular housing shell 41 and the connecting sleeve 45. Oscillations of the connected screw conveyors 200 are thus partly compensated already by the elastomeric areas 43 between the interlocking fins in the connecting units. A misalignment of the connecting shaft 50 in relation to the stationary vertical axis 14 occurs only when the bending moments caused by the two laterally connected screw conveyor shafts 200 are different, which in turn tilts the entire inner shaft bearing unit 20. This misalignment is then compensated for by the elastomeric ring element 13 of the base unit 10.

The elastomeric intermediate layers 13, 43 each have a slightly smaller axial length than the surrounding outer housing shells 11, 41 such that they are largely protected from directly impinging blasting agents. In any case, the kinetic energy of the impinging blast particles is largely compensated for due to the elastic properties such that hardly any abrasive effect arises. Furthermore, a partial removal of the face ends of the elastomeric ring elements 13, 43 does not affect their function. The ring elements 13, 43 thus allow for a wear-free pendulum support of the connecting shaft 50.

There has thus been shown and described a novel bearing device for screw conveyor shafts which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. A bearing device for screw conveyor shafts comprising;
a base unit with a stationary outer housing;
at least one shaft bearing unit swivelly mounted within the base unit, said shaft bearing unit having a housing shell and a rotatable connecting shaft which is guided and supported therein,
at least one elastomeric ring element arranged between an inner surface of the outer housing and an outer surface of the housing shell of the shaft bearing unit; and
an external connecting unit attached to the connecting shaft on at least one side of the shaft bearing unit, said connecting unit having an outer housing shell;
wherein the outer housing of the base unit as well as the outer housing shell of said connecting unit are tubular in shape.

2. The bearing device as defined in claim 1, wherein the shaft bearing unit includes two grooved ball bearings in which the connecting shaft is rotatably supported.

3. The bearing device as defined in claim 1, wherein the outer housing is annular in shape and has at least one bearing bracket connected thereto on the outside thereof.

4. The bearing device as defined in claim 1, further comprising a cover disc on at least one face side of the housing shell of the shaft bearing unit, wherein the cover disc has an annular shape with a central bore for the passage of the connecting shaft, and wherein at least one sealing ring is arranged in an annular gap between the cover disc and the connecting shaft.

5. The hearing device as defined in claim 4, wherein the scaling ring includes a shaft sealing ring.

6. The bearing device as defined in claim 5, wherein the shaft sealing ring includes at least one of a felt sealing ring and a brush seal.

7. The bearing device as defined in claim 6, wherein said at least one of said felt sealing ring and said brush seal is arranged on the outside, in front of the shaft sealing ring.

8. The bearing device as defined in claim 1, wherein the housing shell of the shaft bearing unit and the outer housing of the base unit are bonded together via the at least one ring element.

9. The bearing device as defined in claim 1, wherein the ring element is formed of a polyurethane sealing compound.

10. The bearing device as defined in claim 1, wherein the shaft bearing unit is configured to tilt to both sides from a point of intersection of a central axis and a central vertical axis.

11. The bearing device as defined in claim 1, wherein at least one end of the connecting shaft is connected to a screw conveyor shaft that has a connecting sleeve which is slid over the tubular housing shell of said connecting unit.

12. The bearing device as defined in claim 1, wherein the shaft bearing unit extends axially out beyond the outer housing of the base unit and has a smaller diameter than the base unit, and wherein the tubular housing shell of the external connecting unit has a larger diameter and extends axially in the direction of the base unit, in part covering the protruding portion of the shaft bearing unit.

13. The bearing device as defined in claim 1, wherein said connecting unit has an intermediate sleeve which is bonded together with the outer housing shell by means of a ring element.

14. The bearing device as defined in claim 13, wherein the ring element of each connecting unit is formed of a polyurethane sealing compound.

15. The bearing device as defined in claim 1, wherein the outer housing of the base unit and the outer housing shell of each connecting unit have substantially the same diameter.

\* \* \* \* \*